Jan. 16, 1934.                L. A. HYLAND                1,943,321
              CLUTCH AND BEARING FOR AVIATION GENERATORS
                        Filed Feb. 6, 1932
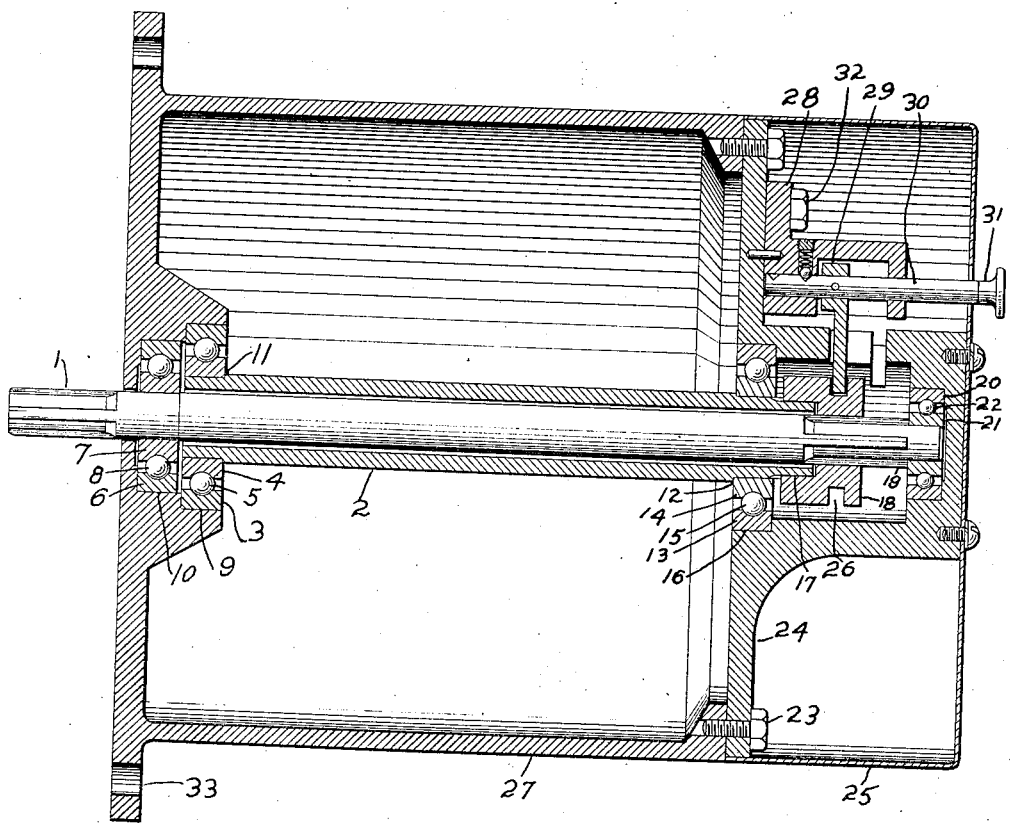
INVENTOR
Lawrence A. Hyland
BY
ATTORNEY

Patented Jan. 16, 1934

1,943,321

UNITED STATES PATENT OFFICE 1,943,321

CLUTCH AND BEARING FOR AVIATION GENERATORS

Lawrence A. Hyland, Washington, D. C.

Application February 6, 1932. Serial No. 591,442

1 Claim. (Cl. 192—67)

(Granted under the act of March 3, 1883, as amended April 30, 1928; 370 O. G. 757)

This invention relates to aviation generators, and more particularly to a clutch and bearing for aviation generators in which the generator proper can be disengaged from the prime mover for independent operation in case the prime mover fails to operate.

An object of this invention is to provide a clutch by means of which an aviation generator can be readily disengaged from its primary driving means.

Another object of this invention is to provide a generator clutch mechanism necessitating little or no increase in weight or size over the usual generator having no clutch.

With the above and other objects in view, the invention consists in the construction, combination and arrangement of parts as will be described more fully hereinafter.

Aviation generators have several problems not met with in other electrical devices. The most important of these problems arise from the methods by which the generator is driven. Of the various drive systems, the two that are more generally employed are the fan drive and direct drive from the aircraft engine. With this type of drive the generator cannot be rotated in the case of engine or fan failure without either removing the fan or disconnecting the generator from the engine. With the fan or engine disconnected, the generator may be revolved from current supplied by auxiliary batteries of the exciter system since the generator is usually designed to act as a motor in case the regular driving power is not supplied. When emergencies arise on aircraft, it is desirable that some quick and easy method of communication be at hand. This requires a radio transmitter which must be supplied with the necessary operating potentials by a generator. The problem of disconnecting the fan or engine drive has been a serious one, since the necessary tools or time have not, as a rule, been available. On the other hand, the necessity for compactness and light weight has prohibited the use of a counter-shaft or clutch of the usual design, with the result that no provision has been made for emergency operation of the primary aircraft generator equipment. The device disclosed herein permits the use of a counter-shaft and clutch without increasing materially the weight of the entire equipment or the space occupied by the equipment.

A better understanding of the invention may be had by reference to the accompanying drawing, in which the single figure is a cross-section view of the generator shaft and clutch mechanism through the center line thereof.

In the drawing a counter-shaft is shown at 1, passing through the main generator armature shaft 2 which is hollow. These two shafts are supported adjacent the ends thereof by appropriate bearings. These bearings are shown as ball bearings having inner and outer races. Bearing 6, 7 and 8 supports the shaft 1 at the end connected to the primary driving means, while bearing 20, 21 and 22 supports the other end of shaft 1. The outer races of these bearings are pressed into appropriate bores of the frame structure. The main frame structure or housing 27 is provided with appropriate bores at 9 and 10, into which these bearings are pressed. The other bearings are supported by the end frame 24. Shaft 1 is splined at 19, while shaft 2 is splined at 17. Mounted on the splined portion of shaft 1 is a collar 18 suitably grooved so as to engage the splines thereof and rotate with the shaft. The collar 18 is slidable along the shaft 1 whereby its recessed end may be made to engage or disengage with the splined portion of shaft 2. The collar 18 is grooved at 26 with a groove running the entire circumference of said collar. A U-arm 29 is provided to engage with the groove 26 for the purpose of moving the collar 18 into either the engaged or disengaged position. U-arm 29 is fixed to a slidable shaft 30 which is mounted in appropriate bearings in a bracket 28. Bracket 28 is fastened to the end frame 24 by means of a cap screw 32. Affixed to the end of slidable shaft 30 is a knob 31 for actuating the U-arm 29 to control the position of the clutch collar. The main generator frame is provided at 33 with apertured flange members for fastening the generator frame or casing to the motor frame or other support. The end frame 24 is appropriately fixed to the main frame 27 by means of cap screws 23. A cover 25 is provided to completely cover the clutch mechanism with the exception of actuating knob 31.

The cover 25 is shown as a cylindrical member although, if the generator is designed for fan drive, it would be made to have a more or less stream-lined effect.

The device disclosed can be assembled readily by inserting the outer ball race 6 into bore 10 of the frame, then inserting outer ball race 3 into bore 9, inserting the shafts, then inserting the ball race 20 into the end frame member 24, then inserting the clutch collar into its proper position in the end frame, then inserting outer ball race 13 into the end frame and applying the end frame to the main frame 27, taking care that the shafts and bearings are in proper alignment. The bracket with the U-arm and actuating assembly is then screwed to the end frame, taking care that the U-arm engages the groove 26 of the clutch collar. The cover 25 is then put into position.

The generator elements have not been shown in the drawing, as they form no part of the invention. However, it might be stated that the rotatable armature is affixed to the generator shaft 2, while the field structure is appropriately fixed inside the casing 27. In practice, the shaft 2 would have mounted thereon a low voltage winding adapted to act as a generator for charging batteries when the shaft 1 is being rotated, and also a high voltage winding for supplying high voltages to radio signaling equipment. In case of a failure of the means for driving the shaft 1, the shaft 1 could be disconnected from the generator shaft by sliding the collar 18 outwardly by means of the knob 31. The low voltage winding of the generator could then be excited by storage batteries to act as a motor and drive the shaft 2 and the associated high voltage winding, whereby the high voltage could be generated by a single generator, irrespective of whether the prime mover is or is not operating.

The special advantages of the mechanism shown herein are that both the generator shaft and the counter-shaft have bearings that are separated by comparatively long distances and are consequently able to handle the stresses set up by self-regulating fans and gear chattering. Furthermore, the clutch system being light and compact, it can be located in that portion of the generator usually covered by a stream-lined cover or, in the case of engine drive generators, by a small projection from the free end of the generator, as shown in the drawing.

It will be understood that the above description and accompanying drawing comprehend only the general and preferred embodiment of my invention, and that various changes in construction, proportion and arrangement of parts may be made within the scope of the appended claim, without sacrificing any of the advantages of this invention.

The invention described herein may be manufactured and used by or for the Government of the United States for governmental purposes without the payment of any royalties thereon.

I claim:

An aviation type generator comprising a main frame member, an auxiliary end frame member mounted thereon having a clutch housing integral therewith, a hollow armature shaft supported in bearings in said frame members and extending beyond the supporting bearing of the auxiliary frame member into said clutch housing, a second shaft mounted within the hollow of said hollow shaft concentric thereto and extending beyond the hollow shaft at both ends, bearings for said second shaft carried by said frame members, splined portions on each of said shafts at the ends extending into the clutch housing, a collar mounted for axial movement on said second shaft, said collar being provided with a small opening extending all of the way therethrough for engaging said second shaft and a larger opening extending part of the way therethrough for engaging said hollow shaft and means for moving said collar into and out of engagement with said hollow shaft.

LAWRENCE A. HYLAND.